No. 746,568. PATENTED DEC. 8, 1903.
O. PARKER.
ACETYLENE GAS GENERATOR.
APPLICATION FILED MAR. 1, 1900.
NO MODEL. 3 SHEETS—SHEET 1.
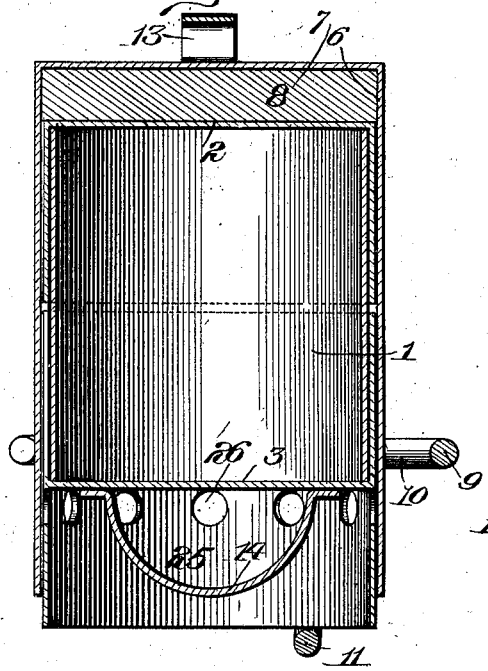
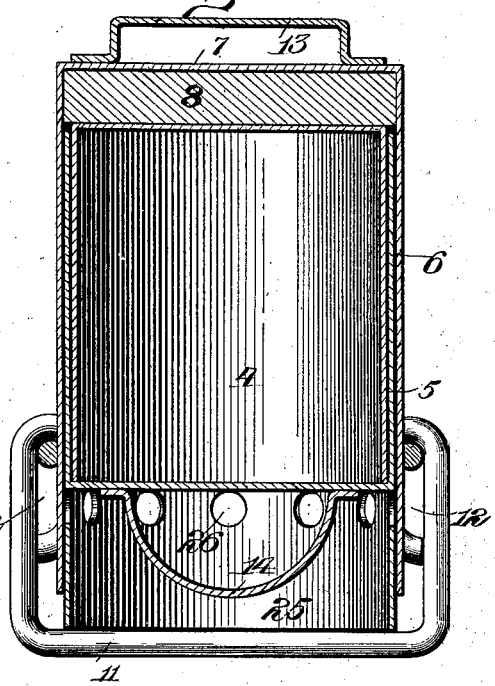
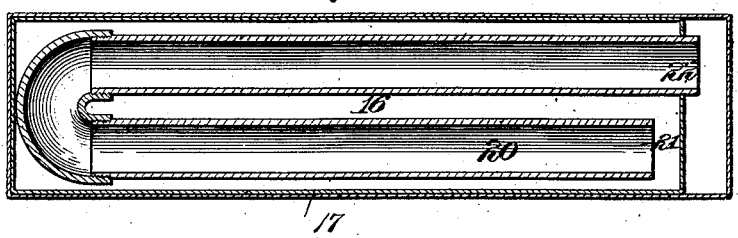

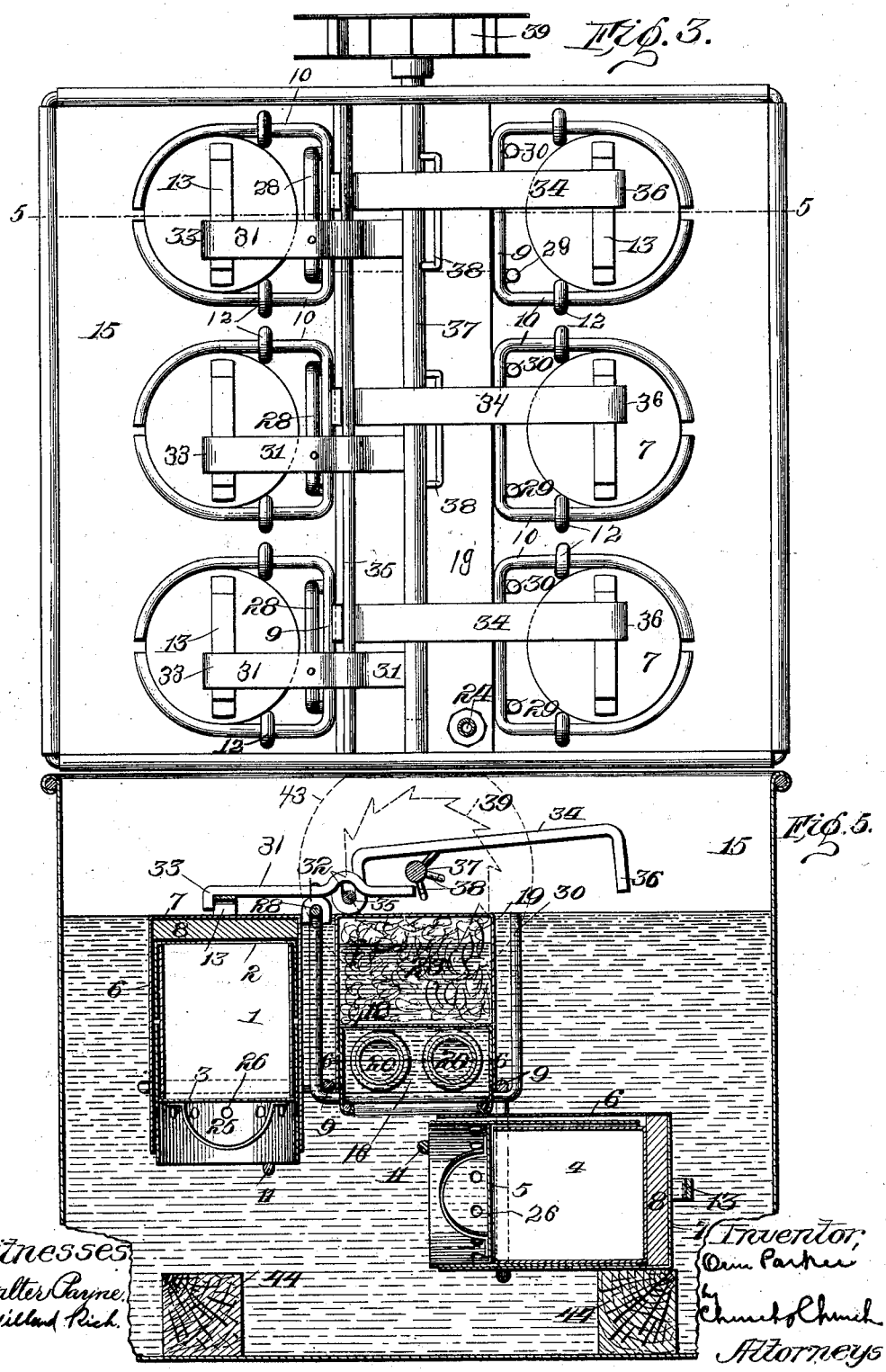

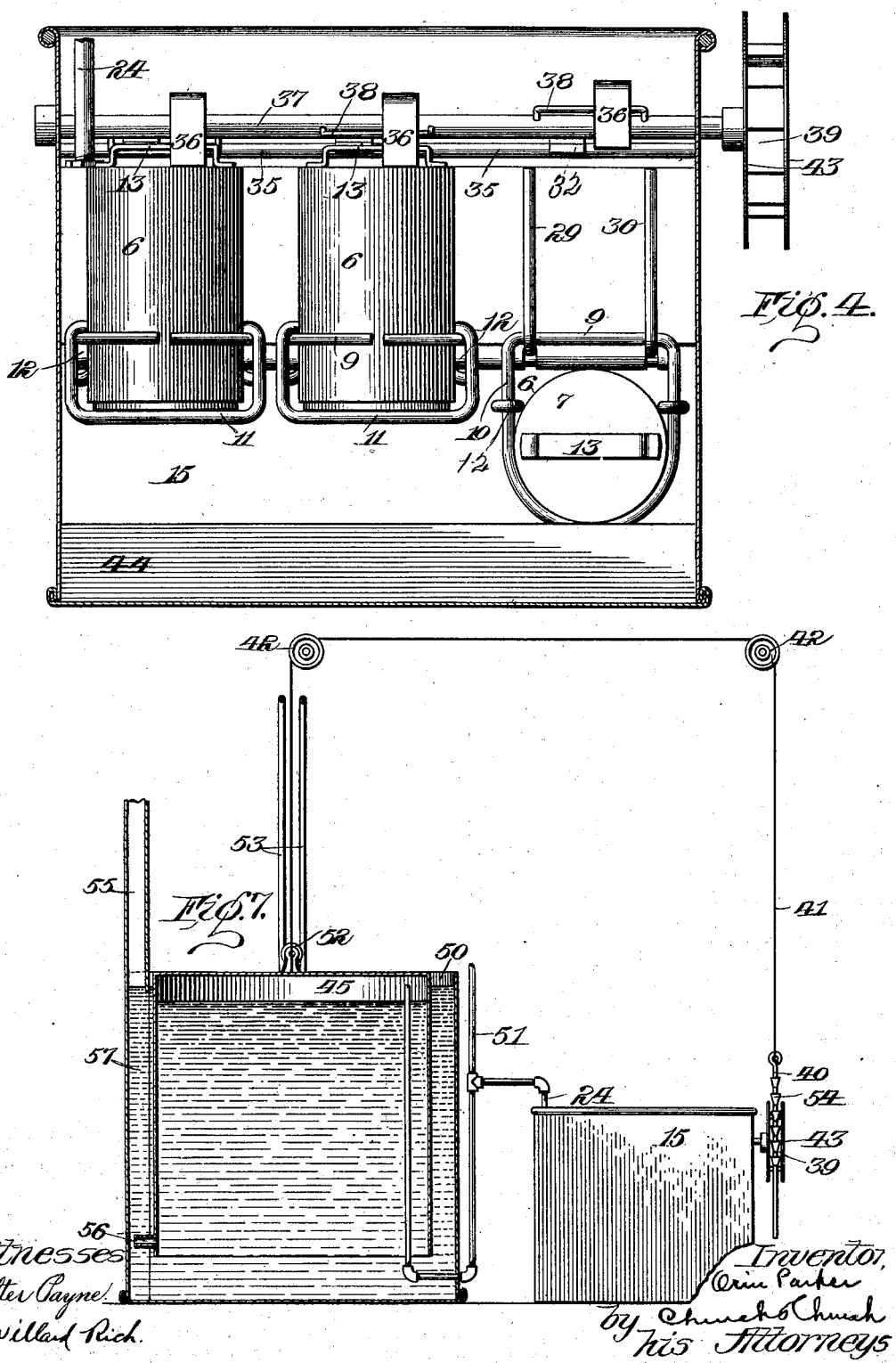

No. 746,568. Patented December 8, 1903.

UNITED STATES PATENT OFFICE.

ORIN PARKER, OF ROCHESTER, NEW YORK.

ACETYLENE-GAS GENERATOR.

SPECIFICATION forming part of Letters Patent No. 746,568, dated December 8, 1903.

Application filed March 1, 1900. Serial No. 6,988. (No model.)

*To all whom it may concern:*

Be it known that I, ORIN PARKER, of Rochester, in the county of Monroe and State of New York, have invented certain new and useful Improvements in Gas-Generators; and I do hereby declare the following to be a full, clear, and exact description of the same, reference being had to the accompanying drawings, forming a part of this specification, and to the reference-numerals marked thereon.

My present invention relates to the production of acetylene from calcic and other carbids, and has for its object to provide a gas-generator in which quantities of carbid are contained in separate visible holders.

A further object of my invention is to provide means for automatically subjecting the carbid in a single holder to the action of a liquid and to bring into successive operation a series of such holders by changes in the volume of a gas in a system without material change in the pressure of the gas, to provide a gas-generator in which the operations of charging with the gas-making material and removing the debris may be performed without opening any portion of the gas-spaces and without the introduction of a material quantity of air, and also to provide a generator in which the gas will be produced slowly and at a low temperature, whereby it may be thoroughly washed and cleansed.

My invention further provides certain improvements in apparatus for generating acetylene or other gas whereby the construction and operation of the same are cheapened and simplified.

To these and other ends my invention consists in certain improvements in construction and combinations of parts, all as will be hereinafter fully described and the novel features pointed out in the claims at the end of this specification.

In the drawings, Figure 1 is a section view of a carbid-holder constructed in accordance with my invention, located in the carrier; Fig. 2, a sectional view of a modified form of my improved carbid-holder, also in the carrier; Fig. 3, a top plan view of a generator constructed in accordance with my invention and utilizing the carbid-holders; Fig. 4, a side elevation of the same with the end of the casing removed, showing the operation of the carbid-holders; Fig. 5, a sectional view on the line $x\ x$ of Fig. 3; Fig. 6, a horizontal sectional view on the line 6 6 of Fig. 5, showing the arrangement of the condenser; Fig. 7, a view, partly in section, showing the connection between the generator and the gas reservoir and supply system and also my improved safety device for a gas system.

Similar reference-numerals in the several figures indicate similar parts.

In order to provide a holder for carbid and other substances which shall be impermeable to vapors and gases and protect the inclosed substances from loss by evaporation and at the same time readily permit the entrance of water or other mixing or leaching liquid and to allow the escape of any gas that may be formed therein, I employ a multiple-walled box or envelop, made of iron or other suitable material, as shown in Fig. 1, embodying an inner tubular component or shell 1 open at opposite ends and two outer components or shells 2 and 3, each open at one side and loosely telescoping over the ends of the inner component in such manner as to form between the walls long and narrow channels, which it will be understood exist between their proximate faces and are the only modes of ingress and egress from the interior. In Fig. 2 I have shown a slightly different form of envelop consisting of an inner shell or component 4 and an outer shell or component 5, each open at one side, and the parts nested in reverse to accomplish the same end. Over these nested shells or components is slipped a shell or carrier 6, having the top 7, upon the inner side of which is a weight 8. The various parts fit loosely together, as described, and are locked against separation.

9 indicates a loop secured to the outer shell 6, having the parallel side arms 10, upon which is suspended a loop or bridle 11, having eyes 12, surrounding the arms and capable of movement thereon, permitting the loop to engage beneath the lower end of the casing or component 3 and preventing its removal. Suitable handles 13 and 14 are provided upon the carrier and component 3 to facilitate handling the device when supplying the carbid, removing the residue after the latter has become exhausted, or for placing the holder in position upon the apparatus.

The form of holder shown in Fig. 2 is the subject of my application for patent, filed December 13, 1898, Serial No. 699,122, and will not, therefore, require further description, mention being simply made of it here to show its application in my present construction of generator to be presently described. The walls of these multiple unsealed holders are made to fit loosely, bringing the proximate faces of the components to form the long and narrow channels described to the end that the vapor or gas that will occupy the space between the adjacent faces may form a bar to the entrance of any other vapor or gas not impelled by sufficient force to move the adhering layers. The force required will vary with the length of the passages and the distance between the proximate faces, and the resistance in the passages may be indefinitely increased by close fitting or by adding additional components, arranged as already described. Carbids placed in these improved holders, unsealed as to liquids, but sealed against the entrance of vapors and gases, may be subjected to an atmosphere heavily laden with vapor or even submerged in a liquid in a position that will prevent the liquid from running in without becoming leached, while at the same time the liquid will readily, though slowly, penetrate to the carbid when the holder is so placed that the liquid may have access to it, as if the holder be placed in a liquid with the open end of an outer component downward the air or gas within the holder will prevent the liquid from rising to reach the interior, while if the holder be placed with the open channels horizontal the liquid will readily pass into the interior, being, in fact, helped to enter by capillary force. In generating the gas these holders may be sunk into a relatively large column of water and the leaching mass kept cool. Also escaping gas engages with and carries out a portion of any liquid within the holder at the top, while a constant stream is entering at the bottom of the holder. This circulation provides an additional process for keeping the temperature of generation at the lowest limit. These holders are equally efficient in protecting other substances than carbids from extraneous vaporous and gaseous influences and will also protect their contents from loss by evaporation by reason of the resistance to the escape of a vapor presented by the long and narrow channels.

A generator constructed according to my invention and utilizing the holders described embodies a tank or casing 15, adapted to contain water or other suitable liquid, having arranged between its opposite sides a gas collecting and condensing chamber 16, inclosed by the sides 17 and top 18, communicating with a superimposed cleansing-chamber 19 by means of a lengthy or tortuous pipe or passage 20, one end of which opens into the end of the collecting-chamber, as at 21, and the other end into the cleansing-chamber, as at 22. This passage may be arranged as shown in Figs. 5 and 6 and is adapted to cause the gas to pass from the lower to the upper chamber by a circuitous route, forming a condenser in which the gas may be subjected for a greater length of time to the washing and cooling effect of the liquid in which the chamber and passage are submerged. The cleansing-chamber 19 is filled with a filtering material 23—such as curled hair, excelsior, or similar finely-divided material—to cause the gas passing through the mass to come in contact with a large area of wet surface, to the end that any impurities held in suspension after leaving the condenser may be strained out.

24 indicates an outlet-passage leading from the generator to the gas reservoir or supply system.

Sufficient quantities of carbid to produce the desired amount of gas are inclosed in a series of separate holders, which, in effect, form carbid-cartridges, and the latter are placed in the weighted carriers and adapted to be partially or wholly submerged in a liquid in the tank and so arranged as to be operated automatically to allow contact of the water with the carbid in a single one of them whenever the volume of the gas in the reservoir or supply system is reduced below a certain amount. The holder is placed at a distance above the bottom of the carrier, forming the air-chamber 25 below the component 3, the purpose of which is to prevent the liquid from running in to reach the interior of the holder when the carrier is being submerged. The holder may be conveniently held above the bottom of the carrier by extending the outer lower component of the holder, as shown in Figs. 1 and 2; but in this case the apertures 26 must be made at the top of the extension to allow of the air escaping from the chamber to the upper part of the carrier and by its compression therein resist the rise of the liquid. Any suitable support for the holder may be employed instead of the extension of the holder. The carriers and inclosed holders are preferably arranged on opposite sides of the condensing and cleansing chambers 16 and 19 and are held on long guides and hooks engaging the loop 9 on each carrier. The hooks for the oppositely-arranged receptacles may be constructed of a single piece of material bent into a U form, with the horizontal portion 28 forming the top, and is then passed through the lower portion of the chamber 16 and the parallel ends 29 and 30 turned upward into a vertical position, as shown. An arm 31 is removably pivoted to the top 28 of each guide or hook by means of an open socket 32 and is provided upon its outer end with the hook 33, engaging the handle 13 on the holder or carrier 6, supporting the latter vertically when in the normal position, similar engaging arms 34 being pivoted at their rear ends to a rod 35 and having upon their outer ends the hooks 36, which serve a like purpose in engaging the carriers upon the opposite side of the chamber.

Located beneath the last-mentioned arms and extending between the sides of the tank 15 is a shaft 37, having cranks or tripping-arms 38 thereon arranged opposite to and adapted to operate upon the arms 31 and 34 to release the carriers successively. The tripping-arms 38 radiate from the same side of the center of the shaft 37 and those for the various carriers are arranged at different angles to each other, as shown particularly in Figs. 3 and 4, so that all the arms holding the carriers upon one side of the chambers will be released and the carriers operated before the arms upon the other side have been engaged. Upon one end of the shaft 37 and arranged exteriorly of the tank 15 is a spur gear or ratchet wheel 39, adapted to be operated in one direction by a rack-bar 40, connected by a rope or cable 41, passing over the pulleys 42 to the dome of a suitable gas-reservoir, as shown in Fig. 7. In my present construction I provide upon each side of the ratchet-wheel 39 disks or flanges 43 and employ a rack-bar 40, having a series of annular ribs or flanges 54, and I extend the lower end of the rack 40, as shown, adapting it when the dome or reservoir is elevated to rest upon the ground or floor with its upper end resting against the ratchet and between the flanges. This construction of the parts is preferable on account of its simplicity and ease of adjustment. The rack-bar may be removed from the wheel and the operative connection between the generator and reservoir disengaged.

The carriers while supported in an upright position on the hooks 27 will thoroughly protect the carbid from moisture or vapors, and as long as they are maintained in the normal position with the open end of the carrier extending downward the holder will be sealed against the entrance of the liquid by the air or gas therein and the vapor will be prevented from passing through the open channel by the contained air or gas which adheres to the proximate faces of the channel, closing the latter and opposing the entrance of any vapor not impelled by force sufficient to displace the adhering gas. When one of the carriers is released, it swings downward, hanging upon the loop 9, turning the open end of the carrier 6 beneath the collecting-chamber 16, entirely submerging the carrier and holder and bringing the passages between the various parts into a horizontal position, whereby the water will be permitted to pass into the holder and the generated gas to pass out through the narrow channels between the parts and upward into the chambers and thence to the reservoir or supply. The long overlapping sides employed in the system of holders will prevent the rapid inflow of the liquid, and while there is a constant generation of gas the presence of the latter will control the flow of the water to the interior of the carbid cartridge and permit only a slow decomposition of the carbid, thereby preventing any excess of heat, and the large quantity of water in proportion to the amount of carbid to be leached, together with the circulation of the liquid through the holder, will also serve to keep the parts cool, and the gas will be produced at a minimum temperature.

44 indicates stops arranged in the bottom of the tank 15 and adapted to support the outer ends of the carriers, so that the latter when released will be arrested in a horizontal position, as shown.

As before mentioned, the carriers, with the carbid-holders, are adapted to be deposited beneath the chamber 16 in the tank 15 whenever the supply of gas has been reduced below a certain amount, and to adapt this mechanism for automatic operation I have connected to my generator a reservoir which may be of the usual or any preferred construction, and in the present instance consisting of the movable bell or dome 45, operating in the casing 50, having the liquid seal between the movable parts. The reservoir is connected to the generator by the pipe 24, as shown, the pipe 51 leading to the gas-main or service-pipe. The dome 45 is guided in its upward and downward movement by the pulleys 52, operating between the parallel guides 53, arranged upon opposite sides of the casing and joining across the top to limit the upward movement of the dome.

The operation of the device will now be readily understood. Equal quantities of carbid are placed in the holders, the holders are placed in the carriers, and the parts are secured by moving the bridles 11 below the bottoms of the components 3. The carriers are then placed in the tank and hung upon the loops 27, and the handles 13 are engaged by the pivoted arms 31 and 34. If the reservoir is empty, the shaft 37 may be manually operated to deposit one of the carriers in the first instance, when the gas so produced will fill the reservoir and raise the dome 45, allowing the rack-bar 40 to descend. The subsequent operation of the carriers is controlled by the movement of the dome. When the amount of gas therein is reduced, the dome falls, causing the shaft 37 to be revolved through the gear 39 and the rack-bar 40. The offset crank-arms 38 will engage successively first with the arms 31 and then with the arms 34, allowing the carriers to be deposited one at a time, as required, for the proper production of the gas. The slight movement of the dome and small force required to trip the arms and release the carriers and the slow and regular production of the gas after the latter have been deposited will permit the maintenance of an even pressure in the gas system, so that the burners may be supplied direct from the generator without danger of impairing the excellence of the light produced, and the gas is supplied from the generator thoroughly washed and cleansed.

The holders described may be used for shipping or storing carbid, and they are equally useful in protecting other substances for use, storage, or shipment. Various constructions and modifications of my devices may be devised by those skilled in the art without departing from the spirit of my invention, and I therefore do not desire to be confined to the precise structures shown.

I do not desire to claim the specific form of carbid holder or cartridge nor the construction of the cleansing-chamber, as these features are reserved to form the subject-matter for a subsequent application.

It will be understood that the term "cartridge-carrier" used in the claims refers to any holder for a charge of carbid.

I claim as my invention—

1. The herein-described carbid and the like carrier adapted for use in a generating apparatus consisting of the casing open at one end, the weight at the opposite closed end, and the handle, in combination with the loop having the parallel arms, and the bridle movably fastened on the arms of the loop.

2. In a gas-generator, the combination with a liquid-containing tank having a chamber open upon its lower side beneath the surface of the liquid, and guides arranged at the sides of the chamber, of the carbid-cartridge carriers supported in the liquid and movable on the guides, the hooks engaging the carriers, and means for releasing the latter.

3. In a gas-generator, the combination with a liquid-containing tank, of a chamber opening beneath the surface of the liquid having the guides, the carbid-cartridge carriers normally sealed against the action of the moisture and supported on the guides beneath the surface of the liquid, the hooks engaging the carriers and supporting them in a vertical position, and means operating to cause the successive release of the carriers.

4. In a gas-generator, the combination with a tank adapted to contain a liquid, the chamber open upon its lower side beneath the surface of the liquid, and the guides, of the carriers for carbid cartridges having the loops engaging the guides, the hook-arms supporting the carriers in a vertical position, and means for operating the arms to release the carriers.

5. In a gas-generator, the combination with a casing containing a liquid, the chamber therein open upon its lower side below the surface of the liquid, the supports at the side of the chamber, and the carbid-cartridge carriers mounted thereon, of the pivoted arms having the hooks engaging the carriers, and means intermittently operated to successively engage the arms and release a single carrier.

6. In a gas-generator, the combination with a tank containing a liquid, the chamber therein open upon its lower side below the surface of the liquid, a series of supports, and the carbid-cartridge carriers mounted thereon and supported beneath the liquid, of the arms engaging the carriers and supporting them out of operative position, and devices operated by the pressure of the gas generated for successively engaging the arms to release a single carrier.

7. In a gas-generator, the combination with a casing containing a liquid, the gas-collecting chamber therein open upon its lower side, the supports, and the carbid-cartridge carriers mounted thereon beneath the surface of the liquid, of the pivoted arms having the hooks engaging the carriers and supporting the latter out of operative position, the shaft having cranks engaging the arms to release the carriers and permit them to pass beneath the collecting-chamber, and means for revolving the shaft.

8. The combination with a gas-generator containing liquid and having the gas-collecting chamber, and the series of carbid-cartridge carriers pivoted outside of the chamber and supported in the liquid and adapted to be turned beneath the chamber to generate gas, and retaining devices for holding the carriers in the normal position, of the gas-reservoir having the movable dome, and connections between the retaining devices and the dome whereby the movement of the latter in one direction will cause a carrier to be moved into the operative position.

9. In a gas apparatus, the combination with a vessel adapted to contain a liquid, of a gas-collecting hood therein open at the bottom, carbid-cartridge carriers arranged in the vessel having narrow passages therein open at the lower end only and normally sealed by the liquid in the vessel in which the ends of said passages are submerged, and means for turning or tilting the carriers beneath the hood to permit the inlet of liquid and escape of gas.

10. In a gas apparatus, the combination with a vessel adapted to contain a liquid, of a gas-collecting hood therein open at the bottom, a plurality of carbid-cartridge carriers in the vessel having narrow passages therein open at the lower end only and sealed by the liquid in the vessel, a gas-reservoir having a movable portion, and connections between the latter and the carriers for tilting one of the carriers beneath the hood when the volume of gas in the reservoir falls below a predetermined amount.

ORIN PARKER.

Witnesses:
G. WILLARD RICH,
WALTER B. PAYNE.